United States Patent
Bang et al.

(10) Patent No.: US 10,082,614 B2
(45) Date of Patent: Sep. 25, 2018

(54) VIEWING ANGLE SWITCHABLE BACK LIGHT UNIT

(71) Applicants: LG Display Co., Ltd., Seoul (KR); COVESTRO DEUTSCHLAND AG, Leverkusen (DE)

(72) Inventors: Hyungseok Bang, Gyeonggi-do (KR); Seungman Ryu, Gyeonggi-do (KR); Joobong Hyun, Seoul (KR); Yongku Lee, Gyeonggi-do (KR); Dongyeon Kim, Busan (KR); Friedrich-Karl Bruder, Krefeld (DE); Günther Walze, Köln (DE)

(73) Assignees: LG Display Co., Ltd., Seoul (KR); Covestro Deutschland AG, Leverkusen (DE)

( * ) Notice: Subject to any disclaimer, the term of this patent is extended or adjusted under 35 U.S.C. 154(b) by 0 days.

(21) Appl. No.: 15/379,976

(22) Filed: Dec. 15, 2016

(65) Prior Publication Data
US 2017/0192150 A1    Jul. 6, 2017

(30) Foreign Application Priority Data
Dec. 30, 2015    (KR) .................. 10-2015-0190473

(51) Int. Cl.
*F21V 8/00* (2006.01)
*G02F 1/13* (2006.01)
*G02F 1/1335* (2006.01)

(52) U.S. Cl.
CPC ......... *G02B 6/0023* (2013.01); *G02B 6/0028* (2013.01); *G02B 6/0068* (2013.01); *G02F 1/1323* (2013.01); *G02F 1/133615* (2013.01)

(58) Field of Classification Search
CPC .. G02B 6/0023; G02B 6/0028; G02B 6/0068; G02F 1/133615; G02F 1/1323
See application file for complete search history.

(56) References Cited

U.S. PATENT DOCUMENTS

| | | | |
|---|---|---|---|
| 8,550,681 B2* | 10/2013 | Sommer | G02B 6/0026 362/555 |
| 2003/0002296 A1* | 1/2003 | Steiner | G02B 6/0006 362/560 |

(Continued)

FOREIGN PATENT DOCUMENTS

| CN | 101013177 A | 8/2007 |
|---|---|---|
| CN | 102588845 A | 7/2012 |

(Continued)

OTHER PUBLICATIONS

Extended European Search Report dated May 4, 2017 for corresponding European Patent Application No. 16205766.5.

(Continued)

*Primary Examiner* — Kevin Quarterman
(74) *Attorney, Agent, or Firm* — Morgan, Lewis & Bockius LLP

(57) ABSTRACT

The disclosure relates to a viewing angle switchable back light unit wherein a general mode and a privacy mode in a liquid crystal display can be selected. A thin film type back light unit includes a light guide film, a light radiator, a first light source, and a light collimator. The light guide film includes a light entering part at one side, a light guiding part extending from the one side to an opposite side of the one side, and a light radiating part on one plane surface. The light radiator is on the light radiating part. The first light source faces the light entering part. The light collimator is on the light entering part facing the first light source. The light collimator receives an expanding light from the first light source, converts the expanding light into collimated light, and provides the collimated light to the light entering part.

10 Claims, 12 Drawing Sheets

(56) References Cited

U.S. PATENT DOCUMENTS

| | | |
|---|---|---|
| 2004/0207775 A1 | 10/2004 | Min et al. |
| 2005/0180687 A1 | 8/2005 | Amitai |
| 2007/0257267 A1 | 11/2007 | Leatherdale et al. |
| 2007/0257271 A1 | 11/2007 | Ouderkirk et al. |
| 2010/0182308 A1* | 7/2010 | Holman ............... G02B 6/0028 345/214 |
| 2010/0237359 A1* | 9/2010 | Cornelissen ......... G02B 6/0028 257/88 |
| 2013/0044514 A1 | 2/2013 | Chang et al. |
| 2015/0253487 A1* | 9/2015 | Nichol ................. G02B 6/0036 362/610 |
| 2015/0268399 A1* | 9/2015 | Futterer ................ G02B 6/005 315/151 |
| 2015/0301261 A1* | 10/2015 | Nevitt .................. G02B 6/0036 349/65 |
| 2015/0301267 A1* | 10/2015 | Ouderkirk ........... G02B 6/0028 362/607 |
| 2016/0139323 A1 | 5/2016 | Remhof et al. |

FOREIGN PATENT DOCUMENTS

| | | |
|---|---|---|
| JP | 2000-249837 A | 9/2000 |
| JP | 2002-131551 A | 5/2002 |
| JP | 2004-319514 A | 11/2004 |
| TW | 200809284 A | 2/2008 |
| TW | 201506503 A | 2/2015 |
| WO | 2015/175648 A1 | 11/2015 |
| WO | 2015/183622 A1 | 12/2015 |

OTHER PUBLICATIONS

Japanese Office Action dated Oct. 24, 2017, issued in corresponding Japanese Application No. 2016-253036.

Taiwanese Office Action dated Oct. 24, 2017, issued in corresponding Taiwanese Application No. 105141909.

* cited by examiner

VIEWING ANGLE SWITCHABLE BACK LIGHT UNIT

This application claims the benefit of Korea Patent Application No. 10-2015-0190473 filed on Dec. 30, 2015, which is incorporated herein by reference for all purposes as if fully set forth herein.

BACKGROUND

Field of the Invention

The present disclosure relates to a viewing angle switchable back light unit in which the general mode and the privacy mode in a liquid crystal display can be selected. Especially, the present disclosure relates to a back light unit in which the display information can be suggested within a specific viewing angle in a liquid crystal display by using an ultra thin light guide film.

Discussion of the Related Art

Nowadays, due to the characteristics of light weight, slim thickness, low consumption electric power, the liquid crystal display device (or, LCD) is widely applied more and more. The LCD is applied to the portable computer such as note book PC, the official automation devices, the audio/video devices, the advertising display device for indoor or outdoor, and so on. The transmittive type LCD, the most used type, represents the video images by modulating the luminescence of the light incident from the backlight unit by controlling the electric field applied to the liquid crystal layer.

Typically, there are two types of back light unit, the one type is the direct type and the other is the edge type. The direct type back light unit has a structure in which a plurality of optical sheets and a diffusion plate are stacked under the liquid crystal panel and a plurality of light sources are disposed under the diffusion plate. FIG. 1 is a cross sectional view illustrating a structure of the liquid crystal display having the direct type back light unit including the light emitting diode (or, LED) array as the light source according to the related art.

The direct type back light unit DBLU includes a light source disposed under a liquid crystal panel LCDP and radiating the back light directly to the liquid crystal panel LCDP. The light source may be a thin fluorescent lamp. Otherwise, as shown in FIG. 1, the light source may be the LED array LEDAR having a lower power consumption and enhanced luminescence. The LED array LEDAR is disposed in a matrix manner on the bottom surface of the case CASE. The case CASE may be installed at the cover bottom CB. In some cases, the case CASE may be omitted, and the LED array LEDAR may be disposed at the cover bottom CB directly. On the LED array LEDAR, a diffusion plate DIFF is disposed. The diffusion plate DIFF diffuses the back light from the LED array LEDAR to provide the evenly scattered back light over the light incident surface of the liquid crystal panel LCDP.

Between the diffusion plate DIFF and the liquid crystal panel LCDP, a plurality of optical sheets OPT may be disposed. The optical sheets OPT include one or more prism sheet, one or more diffusion sheet, and/or a dual brightness enhancement film (or DBEF). The prism sheet converses the scattered and/or diffused back light by the diffusion plate DIFF to the liquid crystal panel LCDP for enhancing the brightness of the back light. The diffusion sheet diffuses again the conversed back light by the prism sheet over the liquid crystal panel LCDP to having evenly distributed luminescence.

A guide panel GP wraps and/or surrounds the side surfaces of the liquid crystal panel LCDP and the direct type back light unit DBLU and supports the liquid crystal panel LCDP by inserting between the liquid crystal panel LCDP and the optical sheets OPT. The cover bottom CB wraps and/or surrounds the case CASE and the bottom surface of the direct type back light unit. On the bottom surface of the case CASE having the LED array LEDAR, a reflective sheet REF is disposed to reflect the back light leaked from the diffusion plate DIFF and/or the optical sheets OPT to the liquid crystal panel LCDP. The top case TP surrounds the upper edge of the liquid crystal panel LCDP and the side surface of the guide panel GP.

In the interim, the edge type back light unit may have thinner thickness than the direct type back light unit. Currently, the liquid crystal display devices have the LED light source rather than the fluorescent lamp. Especially, due to the easy installation of the light source, the edge type back light unit, in which LED light sources are disposed at the side surface of the liquid crystal panel, is more widely applied.

Hereinafter, referring to FIG. 2, we will explain about the edge type back light unit. FIG. 2 is a cross sectional view illustrating a structure of the liquid crystal display having the edge type back light unit including the light emitting diode array as the light source according to the related art.

Referring to FIG. 2, the edge type back light unit comprises a cover bottom CB, a light guide LG disposed at a bottom surface of the cover bottom CB, and light source disposed between the side surface of the light guide LG and the cover bottom CB and providing the back light to the side surface of the light guide LG. The light source may be a thin fluorescent lamp. Otherwise, as shown in FIG. 1, the light source may be the LED array LEDAR having a lower power consumption and enhanced luminescence. The light source may be disposed at the side surface of the light guide LG using the installing means like housing. The light guide LG receives the back light from the LED array LEDAR and refracts the direction of the back light as being perpendicular to the light incident surface of the liquid crystal panel LCDP. Between the light guide LG and the liquid crystal panel LCDP, a plurality of optical sheets OPT is disposed. The optical sheets OPT include one or more prism sheet, and one or more diffusion sheet for scattering and/or diffusing the back light from the light guide LG. To enhance the brightness and/or luminescence, the optical sheets OPT may further include a dual brightness enhancement film (or DBEF).

The guide panel GP wraps and/or surrounds the side surfaces of the liquid crystal panel LCDP and the edge type back light unit, and supports the liquid crystal panel LCDP by inserting between the liquid crystal panel LCDP and the optical sheets OPT. Between the cover bottom CB and the light guide LG, a reflective sheet REF is disposed to reflect the back light leaked from the diffusion plate DIFF and/or the optical sheets OPT to the liquid crystal panel LCDP. The top case TP surrounds the upper edge of the liquid crystal panel LCDP and the side surface of the guide panel GP.

As mentioned above, the liquid crystal display, one example of non-self luminance display, should have the back light unit. The back light unit would be configured to suggest the back light evenly distributed over the whole surface of the liquid crystal panel. Therefore, various optical devices and/or means for transforming a light from the point light source or the line light source to a light from the plane light source. Further, considering the optical characteristics and structures of these optical devices and/or means, the back light unit would have some thickness. Even though the flat type displays including the liquid crystal display are remarkably thinned than the conventional display like CRT (i.e., cathode ray tube), more advanced technology for developing new back light unit suitable for much thinner and lower power consumption display device is required.

The light system according to the related art mentioned above may be applied in the back light unit in the non-self luminance display such as the liquid crystal display. The back light unit is disposed at the rear side of the liquid crystal display for providing the back light to the front side where the observer is located. The back light unit is designed as to radiate the back light to the front direction with evenly distributed luminance.

In most cases, the liquid crystal display provides the video information to all people who can look the front surface of the display. However, in some cases, the liquid crystal display may be designed to provide its video information to specific person positioned in the just front side of the display. For examples of the television sets or the outdoor information displays, it is preferable that the displays are designed to provide good video quality to the public people as many as possible. In that case, the back light unit would have the wide viewing angle of 180 degree and even luminance distribution characteristics over the whole surface of the display. On the contrary, for the personal portable display, it is preferable that the display may be selected as to operate in the privacy mode in which the display can provide the video information just to the person who owns the device. The most back light unit cannot be selectively controlled as to be the privacy mode (operating in the narrow viewing angle) and the general mode (operating in the wide viewing angle).

The only way to select between the privacy mode and the general mode is to attach the privacy optical film on the display surface or detach the privacy optical film from the display surface. More detail, when the privacy optical film is disposed on the front surface of the liquid crystal display, the display can be used in the privacy mode in which the display information can be observed only by the person located just in front of the display. In that case, if the display has certain additional device such as the touch panel, the privacy optical film is added on the additional device so that the additional device may not operate normally. Further, it is somewhat annoying or not easy for user to manage the privacy optical film.

SUMMARY

Accordingly, the present invention is directed to a viewing angle switchable back light unit that substantially obviates one or more of the problems due to limitations and disadvantages of the related art.

An object of the present disclosure is to provide an ultra thin film type back light unit applied to a flat panel display. Another object of the present disclosure is to provide an ultra thin film type back light unit for the flat panel display in which the user can select the narrow viewing angle mode and the wide viewing angle mode. Still another object of the present disclosure is to provide an ultra thin film type back light unit which can be applied to the multipurpose light system in which the narrow radiating angle (for the search light system) and the wide radiating angle (for the general light system) can be freely selected.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a thin film type back light unit comprises a light guide film, a light radiator, a first light source and a light collimator. The light guide film includes a light entering part defined at one side, a light guiding part extending from the one side to an opposite side of the one side, and a light radiating part defined on one plane surface. The light radiator is disposed on the light radiating part. The first light source is disposed as facing to the light entering part. The light collimator is disposed on the light entering part as facing to the first light source. The light collimator receives an expanding light from the first light source, converts the expanding light into a collimated light, and provides the collimated light to the light entering part.

In one embodiment, the light collimator includes a horizontal taper part and a vertical wedge part. The horizontal taper part is disposed near to the first light source. The horizontal taper part collimates an incident light from the first light source on a horizontal plane. The vertical wedge part is extending from the horizontal taper part. The vertical wedge part collimates the incident light from the first light source on a vertical plane. The horizontal taper part includes a light incident surface, a top surface and a bottom surface and two side surfaces. The light incident surface is closing to the first light source, and has a height and a width corresponding to a size of the first light source. The top surface and the bottom surface are extended to one direction from the light incident surface with a predetermined distance and with a predetermined expanding angle. The two side surfaces are defined as the height is extended from the light incident surface with the predetermined distance. The vertical wedge part includes an inclined surface extended along to the one direction from the horizontal taper part in which the height is linearly decreased as converging from the top surface to the bottom surface along to a length of the vertical wedge part.

In one embodiment, the light guiding part propagates the collimated light from the one side to the opposite side. As propagating the collimate light, the light guiding part totally reflects the collimated light at an opposite plane surface facing to the one plane surface. The light guiding part, at the one plane surface, refracts some of the collimated light to the light radiator so as to output the some of the collimated light from the light guide film, and reflects others of the collimated light to the opposite plane surface.

In one embodiment, the back light unit further comprises a second light source. The second light source is disposed as facing to an empty space between each of the horizontal taper part. In one case, the back light unit further comprises a light coupler disposed laterally near to the light collimators in the empty space, wherein the second light source is disposed as facing to the light coupler. In another case, the back light unit further comprises a reflector disposed on at least one of a top surface and a bottom surface.

The present disclosure suggests an ultra thin film type back light unit which can be easily applied to a non-self luminance flat panel display such as liquid crystal display. Further, the present disclosure suggests a back light unit which can be selectively operated in the general mode having the wide viewing angle and the privacy mode having the narrow viewing angle. The back light unit according to the present disclosure can be selectively used in the privacy mode without any additional optical film on the liquid crystal display. Therefore, in the liquid crystal display having the touch panel function, the privacy mode and the general mode can be selected without any obstacles for usage of the touch panel function. In addition, the present disclosure suggests the light system which can be selectively operated in the general light mode and the search light mode according to the usage environment or purpose.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
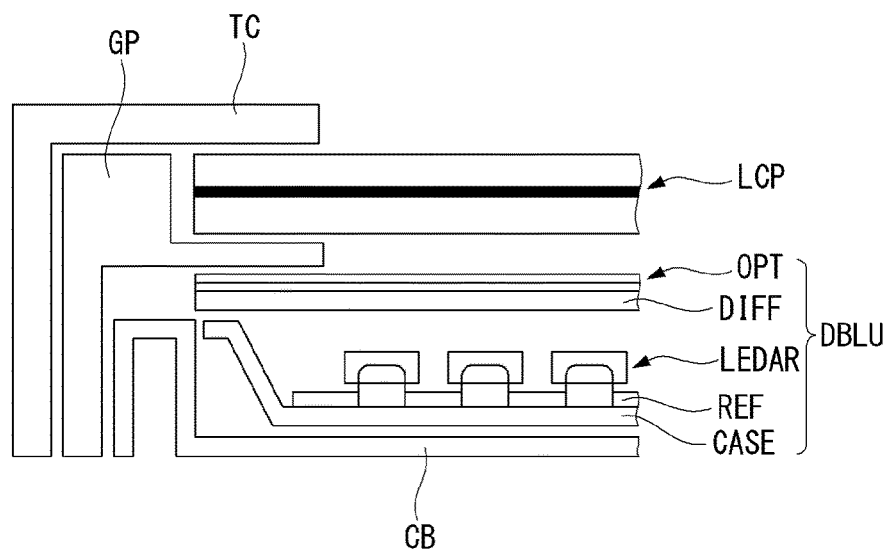
FIG. 1 is a cross sectional view illustrating a structure of the liquid crystal display having the direct type back light unit including the light emitting diode array as the light source according to the related art.
Figure 2:
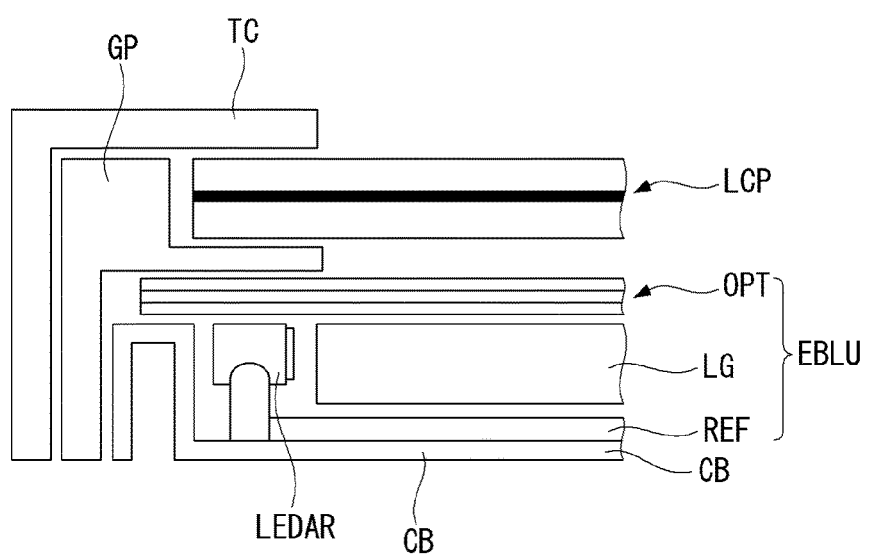
FIG. 2 is a cross sectional view illustrating a structure of the liquid crystal display having the edge type back light unit including the light emitting diode array as the light source according to the related art.

Referring to attached figures, we will explain preferred embodiments of the present disclosure. Like reference numerals designate like elements throughout the detailed description. However, the present disclosure is not restricted by these embodiments but can be applied to various changes or modifications without changing the technical spirit. In the following embodiments, the names of the elements are selected by considering the easiness for explanation so that they may be different from actual names.

First Embodiment

Figure 3:
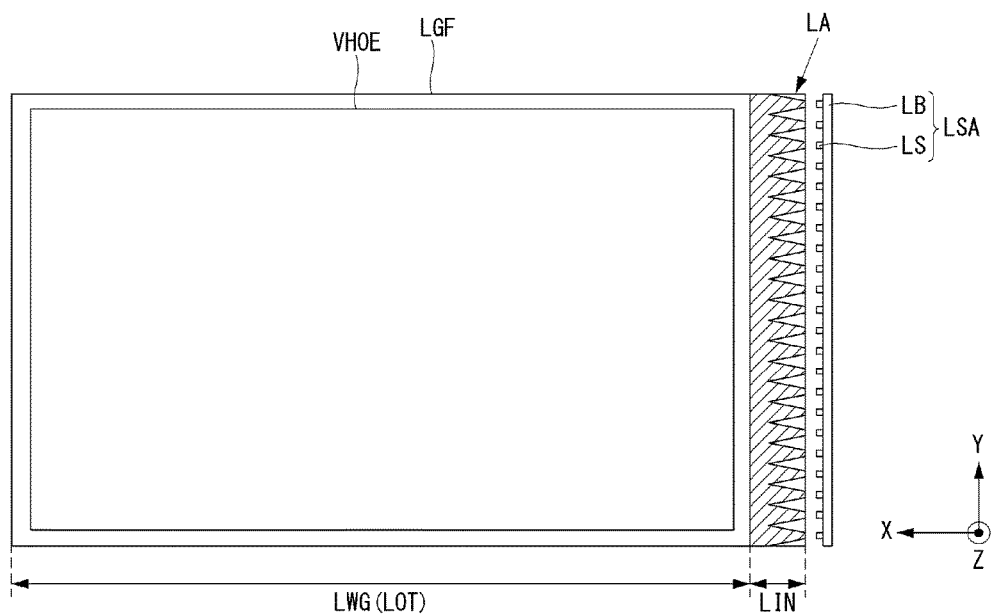
FIG. 3 is a diagram illustrating a structure of an ultra thin film type back light unit according to the first embodiment of the present disclosure.
Figure 3:
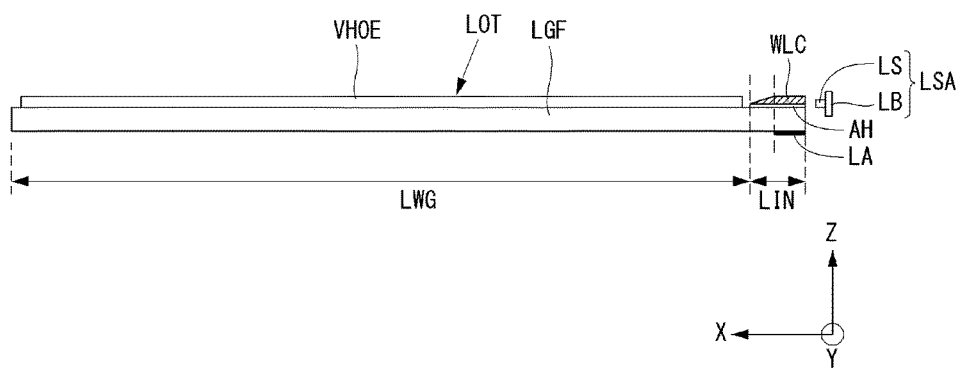

FIG. 3 is a diagram illustrating a structure of an ultra thin film type back light unit according to the first embodiment of the present disclosure. In FIG. 3, the above part is a plane view, as seeing from upside of the thin film type back light unit, and the below part is a side view, as seeing from lateral side. In convenience, the coordinate diagram is noticed at one corner of the figures.

Referring to the FIG. 3, the ultra thin film type back light unit according to the first embodiment of the present disclosure comprises a light guide film LGF, a light source array LSA, a light collimator WLC, an adhesive layer AH and a light radiator VHOE. The light guide film LGF includes a light entering part LIN, a light guiding part LWG and a light radiating part LOT. The light entering part LIN defined at one side of the light guide film sends lights provided from the light source to the light guide film LGF. The light guiding part LWG distributes and propagates the incident lights from the light entering part LIN over most of all areas of the light guide film LGF. That is, the light guiding part LWG extends from the one side of the light guide film LGF to the opposite side to the light entering part LIN. The light radiating part LOT defined on one plane surface, i.e., the top surface. The light radiating part LOT outputs the back light through the top surface of the light guide film LGF with even distribution over the top surface area.

The light source array LSA is disposed near to the light entering part LIN of the light guide film LGF. Especially, the light source array LSA is disposed as facing to the light collimator WLC for providing the lights to the light collimator WLC. The light source array LSA includes a plurality of light sources LS and a light source board LB having the plurality of the light sources LS in certain array manner and a circuit for providing the electric power to the light sources LS.

We will explain about the light source array LSA in detail. The back light unit according to the first embodiment of the present disclosure is an ultra thin film type device for providing a directional lights in which the collimated lights are radiated from a surface light source. It may be preferable that the light source LS is a light source for providing a collimated light. For example, the light source LS includes a laser diode. However, the laser diode is very expensive to apply to the general purpose devices and it may generate the extreme heat. Further, it is very hard that the laser diode is applied to the general purpose back light unit. Therefore, in the first embodiment of the present disclosure, it is preferable that that the general light emitting diode may be used for the light source LS which is inexpensive and generates relatively lower heat. Further, it is required that the lights from the light source LS would be configured to be collimated.

The normal light emitting diode may not provide the collimated light but the expanding (or "diverging") light having the 60~150 degree of expanding angle. When using the expanding lights, the light losses may be high. Even though various methods for reducing the loss of the expanding lights can be applied, the loss of lights would be inevitable. For the large area liquid crystal display or the outdoor liquid crystal display, much higher luminance should be ensured. To do so, it is preferable that a plurality of light sources LS is included.

Considering the above mentioned situations, the light source array LSA may include a plurality of light sources LS disposed in an arraying manner. For example, the light source array LSA may include a light source board LSB and a plurality of light sources LS arrayed on the surface of the light source board LSB along to one horizontal line with certain gap. Even though not shown in figures, the light source board LSB may include the wiring lines and/or the driving circuits for supplying the electric power and signals to the light sources LS. There are many types for the circuit boards or the driving circuits so that the detailed explanation would not be mentioned in this specification.

The arraying manner for the light sources LS in the light source array LSA may be various. The most important things are those; the light amounts for enough luminance are ensured and the expanded lights are converted and changed into the collimated lights. Therefore, it is preferable that the arraying manner is decided by the structure or the optical function and/or characteristics of the light guide film LGF. The arraying manner of the light source LS may be variously applied by the designer according to the physical structure and the optical characteristics of the light guide film LGF explained in below.

The light entering part LIN of the light guide film LGF receives a light from the light source LS disposed on the light source array LSA. The light from the light source LS is radiated and/or expanded as the corn type of which central axis is on the direction of the lights. For example, the light radiated from the light source LS may enter into the light guide film LGF having the expanded angle of 60-120 degree in one side direction from the axis of the light direction. In order to change or convert the expanding light provided from the light source LS into a collimated light, a light collimator WLC is presented in the present disclosure.

At the light entering part LIN of the light guide film LGF, a light collimator WLC is disposed. In detail, the light collimator WLC may be attached on the upper surface of the light guide film LGF by an adhesive layer AH, at the light entering part LIN. The light collimator WLC is an optical element for converting and/or changing the light supplied from the light source LS into a collimated light both on the horizontal plane (XY plane) and on the vertical plane (XZ plane). In detail, the light collimator WLC receives the expanding lights from the light source LS, converts the expanding lights into a collimated light, and provides the collimated light to the light entering part LIN. The horizontal taper part HWD and the vertical wedge part VWD are attached on the light entering part LIN of the light guide film LGF by an adhesive layer AH having a lower refractive index than the refractive index of the light collimator WLC. In some cases, a light absorber LA may be further attached under the bottom surface of the light guide film LGF, as facing with the light collimator WLC. The light absorber LA is an optical element for absorbing or eliminating any lights leaked out from the light collimator WLC. The leaked lights may be the diffused reflection lights by which the collimated property of the light may be hindered.

The collimated light by the light collimator WLC enters into the light guiding part LWG of the light guide film LGF having an incident angle. The light guiding part LWG is the element for receiving the collimated light from the light entering part LIN and for sending it to the opposite side of the light entering part LIN without any loss of the collimated light. The light guiding part LWG is the most of all portions of the light guide film LGF. On the upper surface of the light guiding part LWG, a light radiator VHOE is disposed. It is preferable that the light radiator VHOE has a refractive index lower than that of the light guiding part LWG. In detail, the light in the light guide film LGF would be propagated by the total internal reflection, at the bottom surface of the light guide film LGF. At the upper surface of the light guide film LGF, as propagating the light, most of light would be reflected by the total reflection condition, and some portions of the light would be refracted and go out of the light guide film LGF. Therefore, it is preferable that the refractive index of the light radiator VHOE is higher than that of the air and lower than that of the light guide film LGF.

As the light is propagated through the light guide film LGF, the light radiator VHOE extracts and radiates some portions of the light out of the light guide film LGF. By attached on the upper surface of the light guide film LGF, the light radiator VHOE provides a back light substantially perpendicular to the surface of the light guide film LGF. Further, it is preferable that the light radiator VHOE provides the back light having even luminescence distribution over the whole surface of the light guide film LGF. To do so, it is preferable that the light radiator VHOE would be configured to have the variable light extraction efficiency which is exponentially increasing from the side where the light entering part LIN is disposed to the opposite side.

Until now, referring to FIG. 3, we explained about the whole structure and the operation of the ultra thin film type back light unit according to the first embodiment of the present disclosure. Hereinafter, referring to FIGS. 4 to 11, we will explain about each element of the ultra thin film type back light unit according to the first embodiment, in detail.

Figure 4:
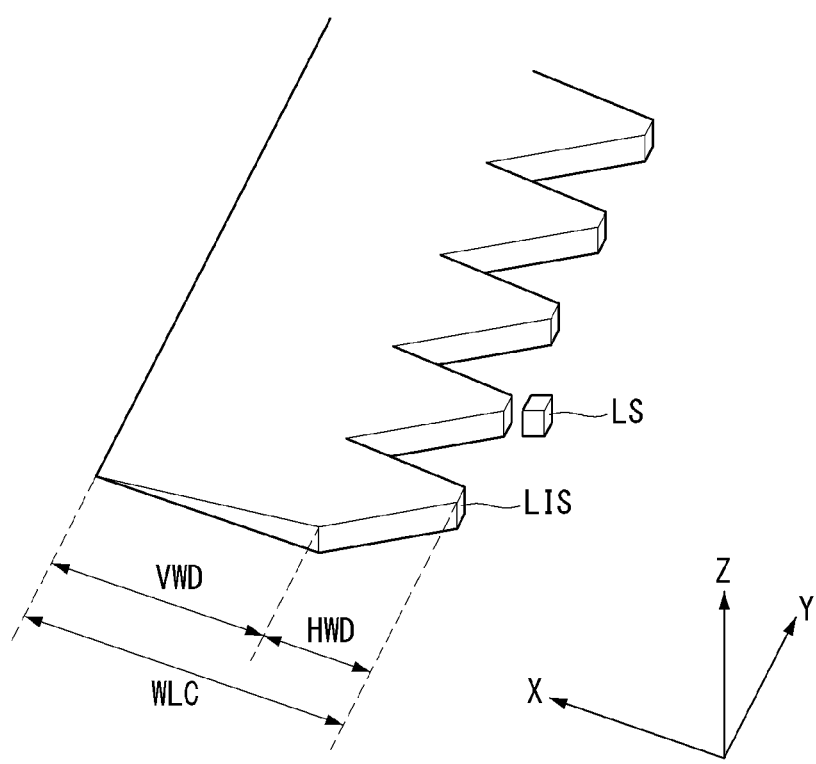
FIG. 4 is a perspective view illustrating the relationship between a light collimator and a light source according to the first embodiment of the present disclosure.
Figure 5:
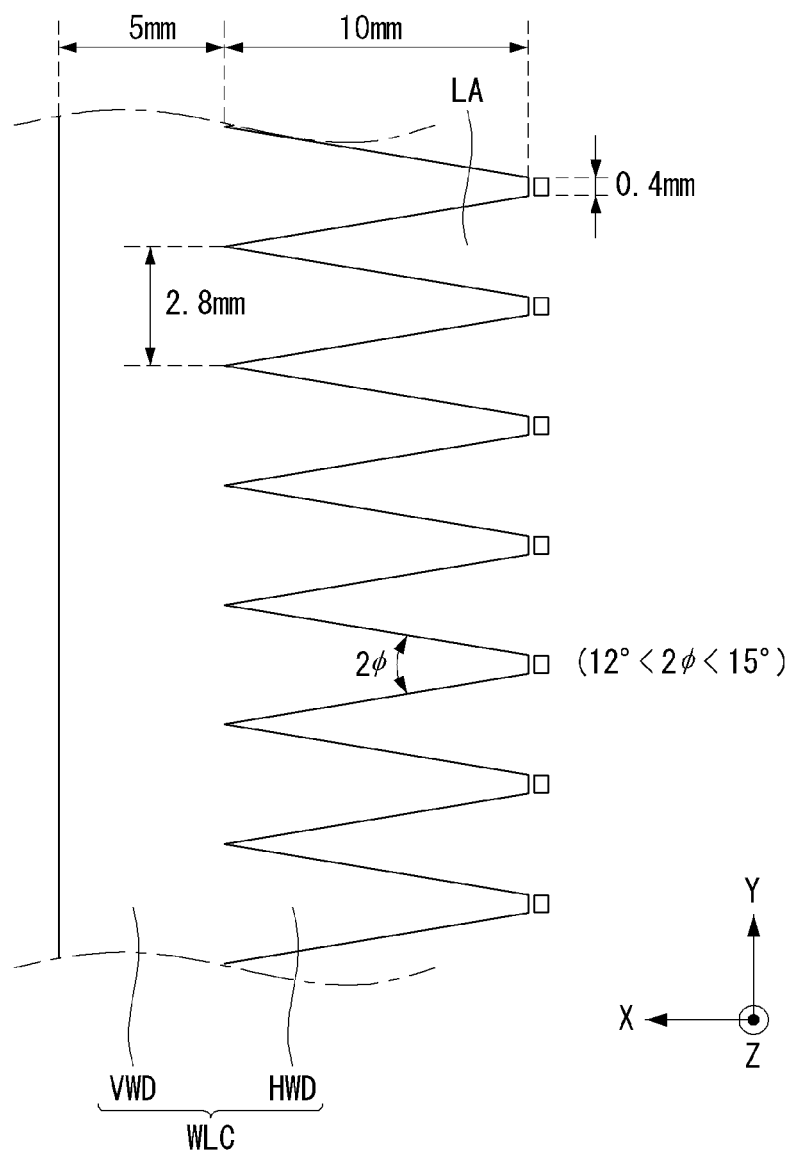
FIG. 5 is a plane view illustrating the structure of the light collimator according to the first embodiment of the present disclosure.
Figure 6:
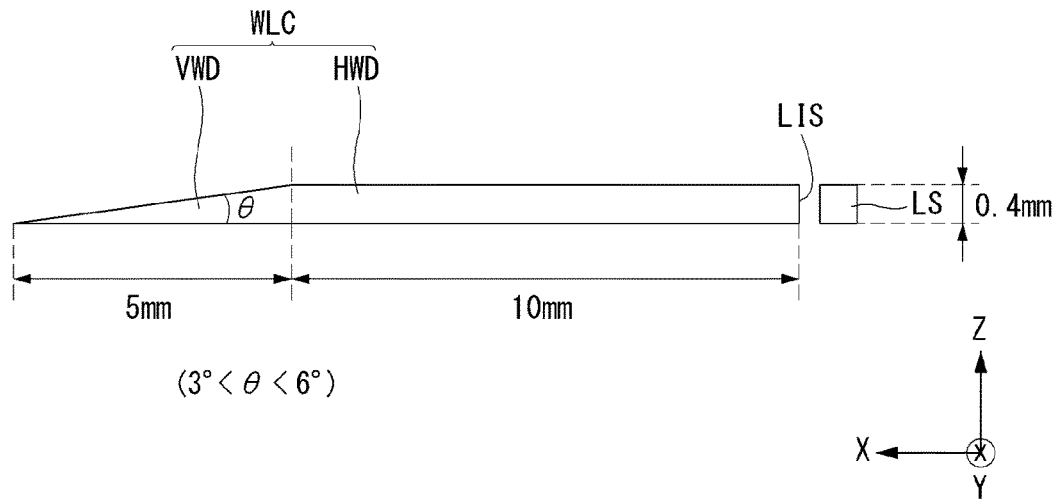
FIG. 6 is a side view illustrating the structure of the light collimator according to the first embodiment of the present disclosure.

Referring to FIGS. 4 to 6, we will explain about the structure of the light collimator WLC included into the ultra thin film type back light unit according to the first embodiment of the present disclosure. FIG. 4 is a perspective view illustrating the relationship between a light collimator and a light source according to the first embodiment of the present disclosure. FIG. 5 is a plane view illustrating the structure of the light collimator according to the first embodiment of the present disclosure. FIG. 6 is a side view illustrating the structure of the light collimator according to the first embodiment of the present disclosure.

The light collimator WLC of the ultra thin film type back light unit according to the first embodiment of the present disclosure comprises a light incident surface LIS, a horizontal taper part HWD and a vertical wedge part VWD. The light incident surface LIS is facing with the light source LS. The horizontal taper part HWD collimates the incident light passing the light incident surface LIS on the horizontal plane (XY plane). The vertical wedge part VWD collimates the incident light on the vertical plane (XZ plane). The incident light means the expanding lights provided from the light source LS.

It is preferable that the light incident surface LIS has the size corresponding to the surface of the light radiating surface of the light source LS. For example, considering the size of the light source LS, the light incident surface LIS may have a square shape of which height and the width may be 0.4 mm. Otherwise, it has a rectangular shape of which height may be 0.9 mm and the width may be 0.6 mm. Hereinafter, we will explain about the square (0.4 mm×0.4 mm) shape case.

The horizontal taper part HWD has a V shape, a wedge shape or a funnel shape which side surfaces are expanded in certain expanding angle with a first distance from the light incident surface LIS, on the horizontal plane (XY plane). In the interim, on the vertical plane (XZ plane), it has thin sheet type extended (not expanded) along to the first distance with the same height. The horizontal expanding angle ($2\phi$) of the horizontal taper part HWD may be variously decided by the designer. Considering the size of the most manufactured liquid crystal display, the horizontal expanding angle ($2\phi$) may preferably be 12~15 degree. For example, the horizontal taper part HWD may have a rectangular truncated pyramid from the light incident surface LIS of 0.4 mm×0.4 mm (height×width) to the rectangular surface of 0.4 mm×2.8 mm (height×width) along to the 10 mm distance (or length). That is, the horizontal expanding angle ($2\phi$) of the horizontal taper part HWD may be about 13.7 degree.

The vertical wedge part VWD is extended from and/or linked to the horizontal taper part HWD. On the horizontal plane (XY plane), the vertical wedge part VWD may be extended with a second distance having the same width. In the interim, on the horizontal plane (XZ plane), the upper (or "top") surface is converged (slanted down) from the upper surface of the light incident surface LIS to the lower (or "bottom") surface along to the second distance (or length). The vertical inclined angle ($\theta$) may variously be decided by the designer. Considering the refractive index of the light guide film LGF and the total internal reflection angle at the bottom surface of the light guide film LGF, the vertical inclined angle ($\theta$) may preferably be 3~6 degree.

For example, the cross sectional shape of the vertical wedge part VWD is a right-angled triangle shape of which the height is 0.4 mm and the base is 6 mm. The vertical wedge part VWD may have a wedge shape which starts from the end of the horizontal taper part HWD and the vertical inclined angel ($\theta$) is about 3.8 degree. Otherwise, the vertical wedge part VWD may have a right-angled triangle shape of which the height is 0.4 mm and the base is 4.0 mm. In that case, the vertical wedge part VWD may have a wedge shape which starts from the end of the horizontal taper part HWD and the vertical inclined angel ($\theta$) is about 5.7 degree. Hereinafter, in convenience, we explain about the case in which the cross sectional view of the vertical wedge part VWD has the right-angled triangle shape of which the height is 0.4 mm and the base is 5.0 mm. In this case, the vertical inclined angel ($\theta$) may be 4.5 degree or less.

As the vertical inclined angel ($\theta$) is getting smaller, the collimation property on the vertical plane is getting better. Considering the physical shape of the vertical wedge part VWD, it is preferable that the vertical inclined angel ($\theta$) is about 4 degree. Therefore, we will explain the embodiments, with 4 degree of the vertical inclined angel ($\theta$), in convenience.

A plurality of the horizontal taper parts HWD may be arrayed along to the Y axis with certain gap. In other words, a plurality of the horizontal taper part HWD are disposed along to a side of the vertical wedge part VWD in a series. The direction (Y axis) of the side is perpendicular to the direction of the X axis. Therefore, the horizontal taper part HWD may have a saw tooth shape in which a series of a plurality of the triangles are branched out from one side of the vertical wedge part VWD.

Figure 7:
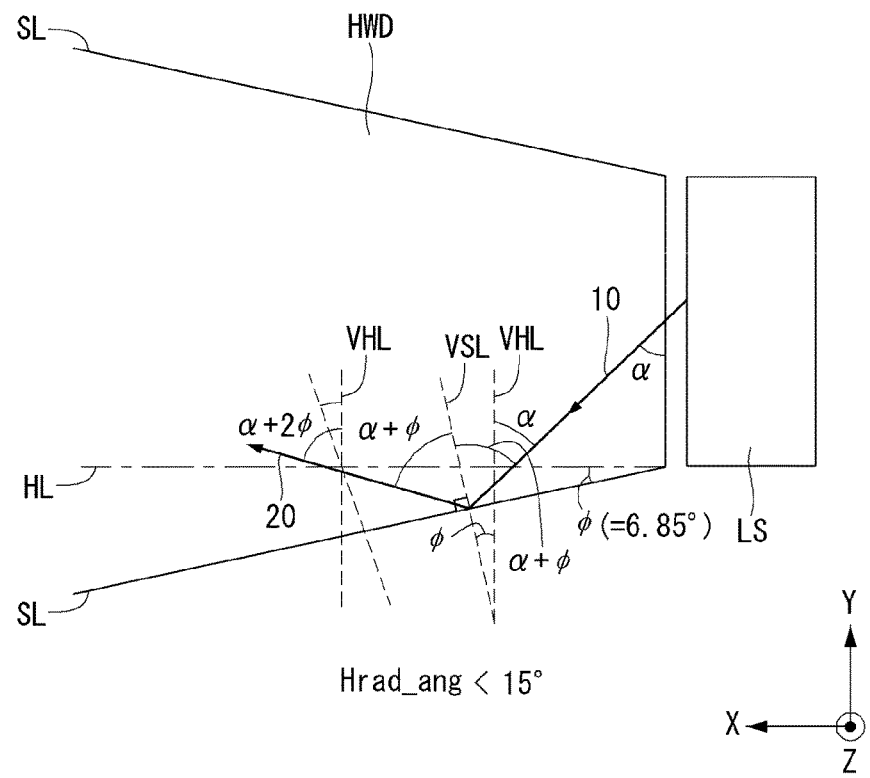
FIG. 7 is a horizontal plane view, on the XY plane, illustrating a light path in the horizontal taper part of the light collimator according to the first embodiment of the present disclosure.
Figure 8:
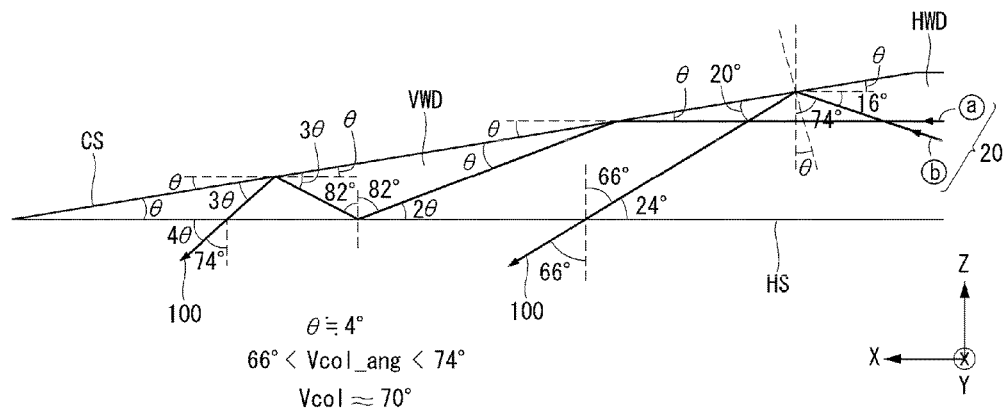
FIG. 8 is a vertical plane view, on the XZ plane, illustrating a light path in the vertical wedge part of the light collimator according to the first embodiment of the present disclosure.

Next, referring to FIGS. 7 and 8, we will explain about the optical function of the light collimator WLC of the ultra thin film type black light unit according to the first embodiment of the present disclosure. FIG. 7 is a horizontal plane view, in the XY plane, illustrating a light path in the horizontal taper part of the light collimator according to the first embodiment of the present disclosure. FIG. 8 is a vertical plane view, in the XZ plane, illustrating a light path in the vertical wedge part of the light collimator according to the first embodiment of the present disclosure.

Here, by adopting the light source LS providing expanding lights, we generate the collimated lights using an optical element including the horizontal taper part HWD and the vertical wedge part VWD. This optical element is considered as the "light collimator WLC". Even though the collimated lights configured by the present disclosure are not perfectly collimated, the collimated lights have very narrow expanding range enough to have very similar optical property with the perfectly collimated lights, such as LASER. Therefore, we consider the lights configured by the present disclosure as the "collimated light".

Referring to FIG. 7, we will explain about the changes of the light path by the horizontal taper parts HWD. The (incident) light 10 from the light source LS enters into the horizontal taper parts HWD. The incident light 10 is the expanded light having certain expanding angle from axis of the light direction, on the horizontal plane (XY plane). The horizontal taper parts HWD has two side surfaces SL extending along to the horizontal expanding angle ($2\phi$). That is, each of two side surfaces SL has the horizontal inclined angle ($\phi$) from the horizontal line HL. The incident light 10 having the incident angle $\alpha$ degree to the side surface SL having the horizontal inclined angle ($\phi$) is reflected by the side surface SL so that the incident angle may be changed into ($\alpha+2\phi$) by the horizontal inclined angle ($\phi$). The incident angle $\alpha$ of the incident light 10 is the angle with the vertical line VHL to the horizontal line HL. The incident light 10 meets the side surface SL having the inclined angle $\phi$ and then it is changed to reflected light 20. The reflected angle of the reflected light 20 to the side surface SL would be $\alpha+\phi$, the angle with the vertical angle VSL to the side surface SL. In the interim, incident angle of the reflected light 20 with the vertical line VHL to the horizontal line HL would be ($\alpha+2\phi$). Consequently, the incident angle of the incident light 10 is changed as being converged to the horizontal line HL (it means "collimated") after reflected by the side surface SL.

Among the incident lights 10, all of the lights having the incident angle less than the total reflection condition at the side surface SL of the horizontal taper parts HWD are reflected by the side surface SL so that go to the light direction (X axis). Some of the lights having the incident angle larger than the total reflection condition are reflected and others may be leaked out of the horizontal taper parts HWD. As the two side surfaces have the horizontal expanding angle ($2\phi$) of 20 degree or less and the horizontal tape parts HWD has higher refractive ration than air, the amount of leaked lights may be minimized. As mentioned above, the incident angle of the reflected lights 20 by the side surface SL is getting lowered as many as being reflected. As the results, the incident light 10 has the horizontal radiation angle (Hrad_ang) is less than 15 degree on the horizontal plane (XY plane). That is, the reflected light 20 would be a horizontal collimated light satisfying: the horizontal radiation angle (Hrad_ang)<15 degree.

Next, referring to FIG. 8, we will explain about the changes of the light path by the vertical wedge part VWD. The horizontal collimated light 20 of which horizontal radiation angle (Hrad_ang) is controlled as being less than 15 degree by the horizontal taper parts HWD enters into the vertical wedge part VWD. The vertical wedge part VWD comprises a horizontal surface HS and an inclined surface CS. On the vertical plane (XZ plane), the horizontal collimated light 20 is not collimated or its expanding angle is not controlled in narrow range, yet. However, by the inclined surface CS, the horizontal collimated light 20 may be a vertical collimated light 100 on the vertical plane (XZ plane).

FIG. 8 shows how the horizontal collimated light 20 is converted into the vertical collimated light 100. For example of that the inclined angle of the inclined surface CS is about 4 degree, the horizontal light ⓐ among the horizontal collimated light 20 may be reflected three times by the inclined surface CS and then goes out of the light collimator WLC with having the incident angle (or refractive angle) of 74 degree or less. In the interim, the expanded lights ⓑ among the horizontal collimated light 20 may be reflected one time or two times by the inclined surface CS and then go out of the light collimator WLC with having the incident angle (or refractive angle) of 66 degree or more.

Consequently, the incident light 10 from the light source LS is converted into the horizontal collimated light 20 having the expanding angle of 15 degree or less on the horizontal plane (XY plane) by the horizontal taper part HWD of the light collimator WLC. After that, the horizontal collimated light 20 is converted into the vertical collimated light 100 which having the collimated angle Vcoll around 70 degree on the vertical plane (XZ plane) by the vertical wedge part VWD. Here, the vertical collimated light 100 is collimated in the vertical plane as well as in the horizontal plane. That is, by the light collimator WLC, the diverging lights from the general LED light sources can be changed or converted into a horizontal-vertical collimated light 100. The horizontal-vertical collimated light enters into the light entering part LIN of the light guide film LGF.

Here, as the expanding angle range on the horizontal plane is less than 13 degree and the expanding angle range on the vertical plane is less than 10 degree, it can be decided that the light is collimated both on horizontal plane and on the vertical plane. Even though it is not perfectly collimated as the LASER, we certified or ascertained that the horizontal-vertical collimated light of the present disclosure has the substantially same property with the LASER according to various optical experiments. Consequently, when the expanding angle of a light is controlled within 15 degree on the horizontal plane and the vertical plane, we can say that the light is collimated.

Figure 9:
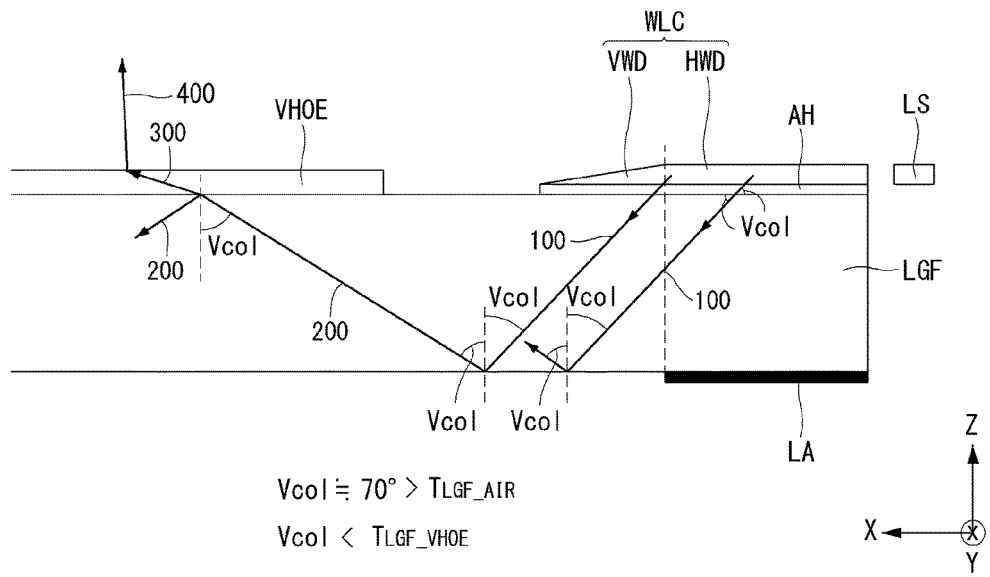
FIG. 9 is a vertical side view, on the XZ plane, illustrating a light path in the back light unit according to the first embodiment of the present disclosure.
Figure 10:
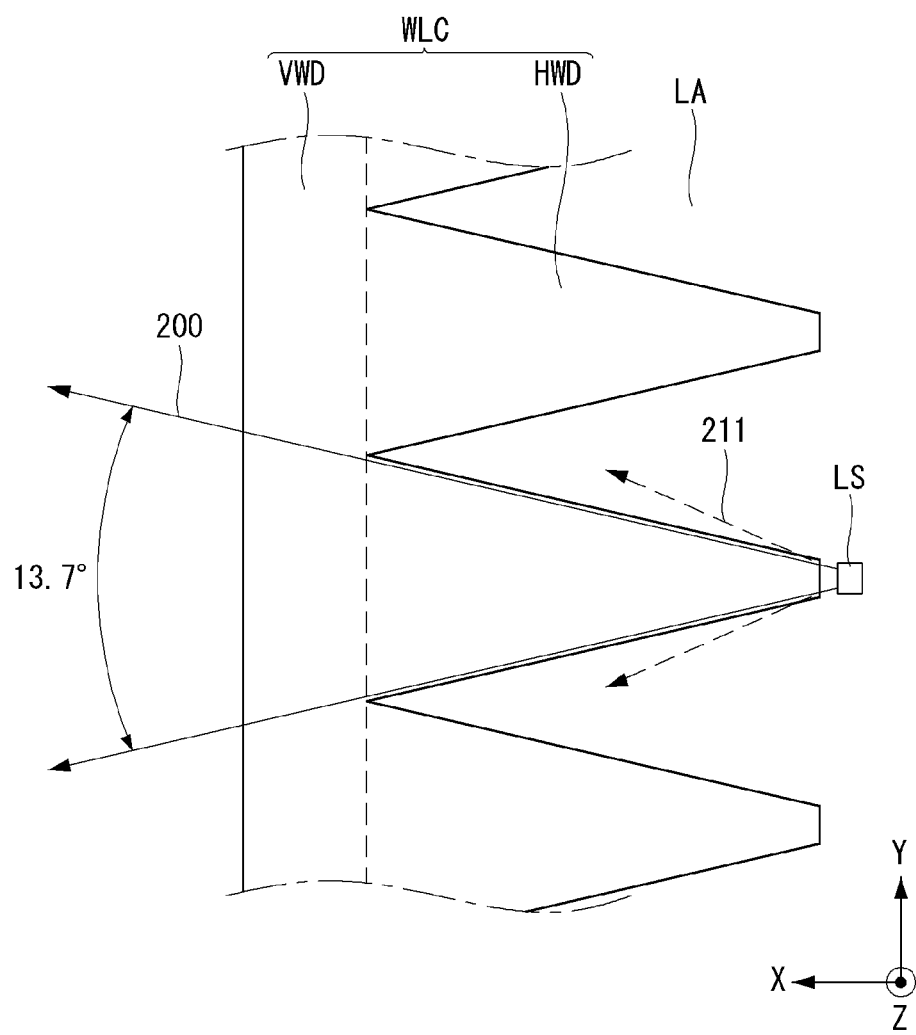
FIG. 10 is a horizontal side view, on XY plane, illustrating a light path in the back light unit according to the first embodiment of the present disclosure.

Hereinafter, referring to FIGS. 9 and 10, we will explain about the profile and/or the procedure of the light from the light entering part to the light radiating part through the light guiding part in the light guide film according to the first embodiment of the present disclosure. FIG. 9 is a vertical side view, in the XZ plane, illustrating a light path in the back light unit according to the first embodiment of the present disclosure. FIG. 10 is a horizontal side view, in XY plane, illustrating a light path in the back light unit according to the first embodiment of the present disclosure.

Referring to FIG. 9, the horizontal-vertical collimated light 100 (or "collimated light") by the light collimator WLC enters into the light guide film LGF through the light entering part LIN. Here, the incident angle Vcol of the collimated light 100 is about 70 degree. It is preferable that the incident angle Vcol of the collimated light 100 is larger than the total internal reflection angle $T_{LGF-AIR}$ at the bottom surface of the light guide film LGF. To keep this condition when the collimated light 100 is entering into the light guide film LGF, it is preferable that the light guide film LGF has the refractive index equal to or less than the refractive index of the light collimator WLC.

For example, when the light collimator WLC and the light guide film LGF have the similar refractive index, the collimated light 100 is not refracted as entering into the light guide film LGF from the light collimator WLC. That is, the incident angle Vcol of the collimated light 100 is maintained or changed not so much as passing the top (or "upper") surface of the light guide film LGF. Then, in the light guide film LGF, the collimated light 100 goes to the bottom surface of the light guide film LGF with the same incident angle Vcol. As the incident angle Vcol of the collimated light 100 is larger than the total internal reflection angle $T_{LGF-AIR}$ at the bottom surface of the light guide film LGF, all portions of the collimated light 100 are reflected. The reflected light 200 goes to the upper surface of the light guide film LGF.

When the refractive index of the light collimator WLC is larger than that of the light guide film LGF, the collimated light 100 is refracted at the top surface of the light guide film LGF as the incident light Vcol of the collimated light 100 to be larger. That is, the incident angle Vcol of the collimated light 100 has the larger value than the total internal reflection angle $T_{LGF-AIR}$ at the bottom surface of the light guide film LGF. Therefore, at the bottom surface of the light guide film LGF, all portions of the collimated light 100 are totally reflected. The reflected light 200 goes to the upper surface of the light guide film LGF. Preferably, the reflected light 200 is propagated, without any losses, to the top surface of the light guide film LGF where the light radiator VHOE is disposed.

In order to make the incident angle Vcol of the collimated light 100 be larger than the total internal reflection angle $T_{LGF-AIR}$ at the bottom surface of the light guide film LGF, it is preferable to adjust or select the refractive index of the adhesive layer AH between the light collimator WLC and the light guide film LGF, properly. For example, the adhesive layer AH may have a refractive index lower than that of the light collimator WLC. In this case, the collimated light 100 is refracted as passing the adhesive layer AH, and it is refracted again as entering into the light guide film LGF. The final incident angle of the collimated light 100 decided by the differences of the refractive indexs of the light collimator WLC, the adhesive layer AH and the light guide film LGF may be somewhat larger than 70 degree of the incident angle Vcol of the collimated light 100.

The reflected light 200 reaches to the top surface of the light guide film LGF. On the top surface of the light guide film LGF, the light radiator VHOE is attached. The light radiator VHOE is one of the optical films having larger refractive index of the air. Therefore, at the interface between the light guide film LGF and the light radiator VHOE, some of the reflected light 200 are refracted and then enter into to light radiator VHOE as a refracted light 300. Other portions of the reflected light 200 are reflected into the light guide film LGF. Here, when the refractive index of the light radiator VHOE is lower than that of the light guide film LGF, most of all reflected light 200 are reflected into the light guide film LGF and little amount of the reflected light 200 may be refracted into the light radiator VHOE as the refracted light 300. Therefore, it is preferable that the incident angle Vcol of the collimated light 100 is lower than the total internal reflection angle $T_{LGF\_VHOE}$ between the light guide film LGF and the light radiator VHOE.

The refracted light 300 into the light radiator VHOE may be further refracted by the light radiator VHOE so as to be a back light 400 which is almost perpendicular to the top surface of the light guide film LGF and goes out to the air. Over all surfaces of the light radiator VHOE, the summation of the back light 400 is provided from the back light unit according to the present disclosure.

The reflected light 200 reflected at the interface between the light guide film LGF and the light radiator VHOE is totally reflected again at the bottom surface of the light guide film LGF. The light path explained above is done over again. So that, some of the reflected light 200 extracted out through the light radiator VHOE and others are reflected into the light guide film LGF. Consequently, as the reflected light 200 propagates into the light guide film LGF from one side where the light entering part LIN is disposed to the opposite side, some portions of the reflected light 200 are extracted as the back light 400.

In order to fully satisfy the light path explained above, the optical properties of each element are very important. For example, it is preferable that the light guide film LGF is made of an transparent film of which refractive index is one of 1.40 to 1.55. The light collimator WLC is preferably made of a transparent film of which refractive index is one of 1.41 to 1.57, and somewhat higher than that of the light guide film LGF. Further, it is preferable that the adhesive layer AH used for attaching the light collimator WLC on the light guide film LGF includes an adhesive material of which refractive index is one of 1.35 to 1.42. Especially, the refractive index of the adhesive layer AH is preferably somewhat lower than that of the light collimator WLC. In the interim, the refractive index of the adhesive layer AH may be equal or lower than that of the light guide film LGF. However, it is required to make the incident angle of the collimated light 100 be larger. It is preferable that the refractive index of the adhesive layer AH is higher than that of the light guide film LGF. Further, it is preferable that the refractive index of the light radiator VHOE is one of 1.35 to 1.50. The refractive index of the light radiator VHOE is preferably lower than that of the light guide film LGF.

Referring to FIG. 10, the most of lights provided from the light source LS enter into the horizontal taper part HWD so as to be horizontally collimated. Here, some portions of the lights may be leaked out of the horizontal taper part HWD as a leaked light 211. The leaked light 211 is out of the horizontal collimation range. Entering into the light guide film LGF, the leaked light 211 may be reflected to the top surface of the light guide film LGF and then it may be one of key element hindering the formation of the back light 400 which has certain directivity. To eliminate the leaked light 211, it is preferable that a light absorber LA is disposed under the bottom surface of the light guide film LGF as corresponding to the horizontal taper part HWD, as shown in FIG. 9.

Figure 11:
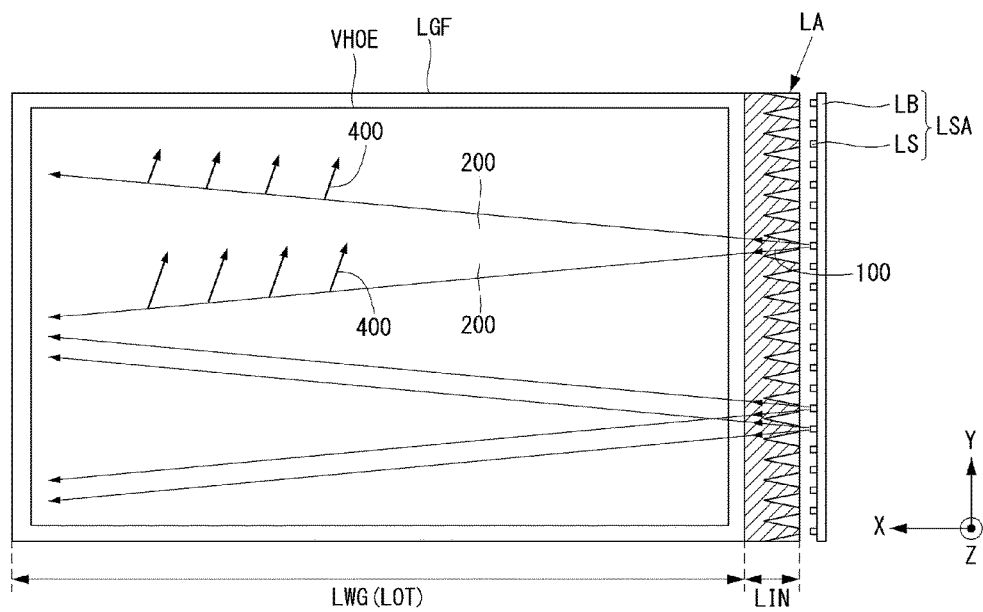
FIG. 11 is a plane view, on XY plane, illustrating the changes of the light paths at a light incident part, a light guiding part and a light radiating part according to the first embodiment of the present disclosure.

Next, referring to FIG. 11, we will explain about how the back light unit provides the back light, in the plane view, according to the first embodiment. FIG. 11 is a plane view, on XY plane, illustrating the changes of the light paths at a light incident part, a light guiding part and a light radiating part according to the first embodiment of the present disclosure.

Referring to FIG. 11, the light from the light source LS is converted into the collimated light 100 by the light collimator WLC and then the collimated light 100 enters into the light guide film LGF. The light collimator WLC is configured to control the collimated light 100 have an incident angle satisfying the total internal reflection condition at the interface between the light guide film LGF and the air. The collimated light 100 may propagate within the light guide film LGF as repeating the total reflection from one side of the light guide film LGF where the light entering part LIN is disposed to the opposite side.

As the reflected light 200 propagates within the light guide film LGF, some amount of the reflected light 200 are gradually extracted and provided as the back light 400 by the light radiator VHOE. The light radiator VHOE may be a transparent film including a volume grating pattern or a holography pattern. For example, the light radiator VHOE may have a volume grating pattern or a holography pattern having the light radiating efficiency evenly distributed over all surface of the light radiator VHOE. In detail, when the light radiating efficiency of the light radiator VHOE is 3%, at the nearest portion to the light entering part LIN of the light radiator VHOE, the 3% of the reflected light 200 is extracted as the back light 400 and 97% is reflected into the light guide film LGF as the reflected light 200. Next, 97% of the reflected light 200 is totally reflected from the bottom surface of the light guide film LGF. Then, 3% of the 97%, that is 2.9% of original light (the collimated light 100), is extracted as the back light 400.

With this manner, the brightness of the back light 400 may be gradually darken as going to the opposite side of the light entering part LIN. However, as shown in FIG. 11, each reflected light 200 of the collimated light 100 from the light source LS are overlapped each other. Further, the overlapped area is getting larger as going to the opposite side from the light entering part LIN. Therefore, the darken (or "reduced") light amount as the reflected lights 200 are propagating by the total reflection can be compensated by the overlapping of each reflected light 200. As the result, the brightness (or "luminance") of the back light 400 may be evenly distributed over all surface area of the light radiator VHOE.

In the case that, with the overlapping of the reflected lights 200, the brightness of the back light 400 cannot be configured to be evenly distributed, it is preferable that the light extraction efficiency of the light radiator VHOE is gradually increased as going from the side where the light entering part LIN is disposed to the opposite side. For example, in the case that the volume grating pattern is included into the light radiator VHOE, the density of the volume grating pattern may be gradually higher from the light entering part LIN side to the opposite side. In that case, the gradual increasing profile may be a linearly increased profile or an exponentially increased profile.

For another example, in the case that the light radiator VHOE includes a holography pattern, the holography pattern is recorded as having the variable extraction efficiency according to the distance from the light entering part LIN. In detail, the holography pattern may be recorded as having the linearly increasing light extraction efficiency or the exponentially increasing light extraction efficiency, as being apart from the light entering part LIN.

In the case that light radiator VHOE is made of the transparent film having the holography pattern, the 'light extraction function', 'the light deflection function' and/or 'the light diffusing function' may be selectively combined so as to ensure any wanted function according to the purposes of the back light unit. Therefore, using the holography pattern is easier method for ensuring the high degree of the freedom for design the back light unit according to the present disclosure.

Second Embodiment

Figure 12:
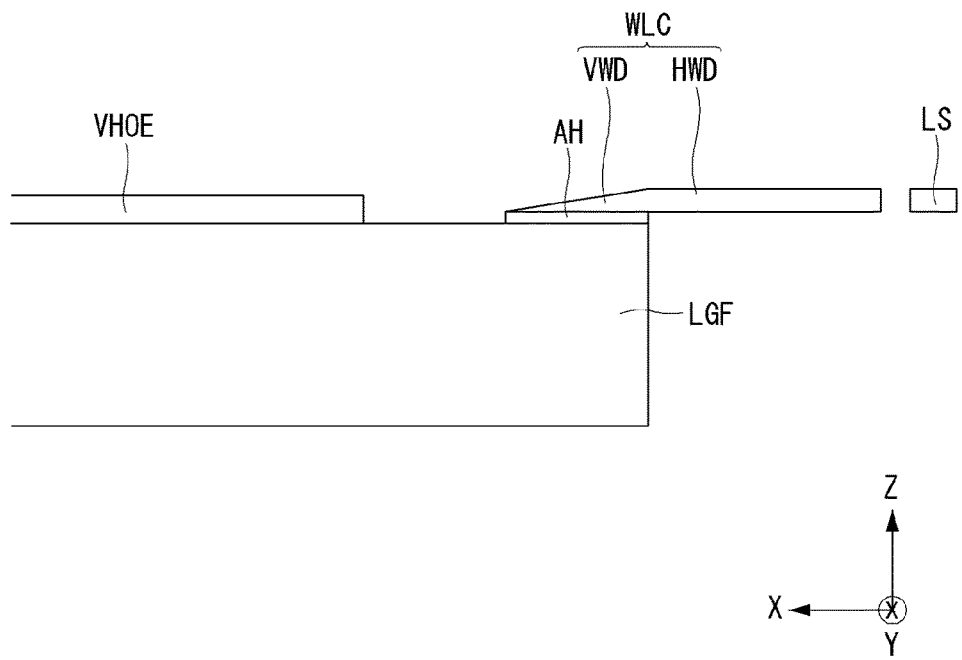
FIG. 12 is a side view illustrating a structure of an ultra thin film type back light unit according to the second embodiment of the present disclosure.

Hereinafter, referring to FIG. 12, we will explain about the ultra thin film type back light unit according to the second embodiment of the present disclosure. FIG. 12 is a side view illustrating a structure of an ultra thin film type back light unit according to the second embodiment of the present disclosure.

The basic structure of the elements of the ultra thin film type back light unit according to the second embodiment is very similar with that of the first embodiment. The main difference may be on the position of the light collimator WLC.

Referring to FIG. 12, the ultra thin film type back light unit according to the second embodiment of the present disclosure comprises a light guide film LGF, a light source array LSA, a light collimator WLC, an adhesive layer AH and a light radiator VHOE. The light guide film LGF includes a light entering part LIN, a light guiding part LWG, and a light radiating part LOT. The light entering part LIN sends lights provided from the light source to the light guide film LGF. The light guiding part LWG distributes and propagates the incident lights from the light entering part LIN over most of all areas of the light guide film LGF. The light radiating part LOT outputs the back light through the upper surface of the light guide film LGF with even distribution over the surface area.

The light source array LSA is disposed near the light entering part LIN of the light guide film LGF. Especially, the light source array LSA is disposed as providing the lights to the light collimator WLC. The light source array LSA includes a plurality of light sources LS and a light source board LB having the plurality of the light sources LS in certain array manner and a circuit for providing the electric power to the light sources LS.

At the light entering part LIN of the light guide film LGF, a light collimator WLC is disposed. In detail, the light collimator WLC may be attached on the upper surface of the light guide film LGF by an adhesive layer AH, at the light entering part LIN. The light collimator WLC is an optical element for converting and/or changing the light supplied from the light source LS into a collimated light both on the horizontal plane (XY plane) and on the vertical plane (XZ plane).

The light collimator WLC of the ultra thin film type back light unit according to the second embodiment of the present disclosure comprises a light incident surface LIS (like the first embodiment), a horizontal taper part HWD and a vertical wedge part VWD. The light incident surface is facing with the light source LS. The horizontal taper part HWD collimates the incident light passing the light incident surface LIS on the horizontal plane (XY plane). The vertical wedge part VWD collimates the incident light on the vertical plane (XZ plane). When the incident lights enters into the horizontal taper part HWD of the light collimator WLC, some of the incident lights may be leaked out of the horizontal taper part HWD. In order to prevent these leaked lights from entering into the light guide film LGF, only the vertical wedge part VWD of the light collimator WLC is attached on the end portions of the light guide film LGF. In other words, the horizontal taper part HWD is not attached on the light guide film LGF, but disposed outside of the light guide film LGF.

The collimated light by the light collimator WLC enters into the light guiding part LWG of the light guide film LGF having narrow incident angle range. The light guiding part LWG is the element for receiving the collimated light from the light entering part LIN and for sending it to the opposite side of the light entering part LIN without any loss of the collimated light. The light guiding part LWG is the most of all portions of the light guide film LGF. On the upper surface of the light guiding part LWG, a light radiator VHOE is disposed. It is preferable that the light radiator VHOE has a refractive index lower than that of the light guiding part LWG. In detail, the light in the light guide film LGF would be propagated by the total internal reflection, at the bottom surface of the light guide film LGF. At the upper surface of the light guide film LGF, as propagating the light, most of light would be reflected by the total reflection condition, and some portions of the light would be refracted and go out of the light guide film LGF. Therefore, it is preferable that the refractive index of the light radiator VHOE is higher than that of the air and lower than that of the light guide film LGF.

As the light is propagated through the light guide film LGF, the light radiator VHOE extracts and radiates some portions of the light out of the light guide film LGF. By attached on the upper surface of the light guide film LGF, the light radiator VHOE provides a back light substantially perpendicular to the surface of the light guide film LGF. Further, it is preferable that the light radiator VHOE provides the back light having even luminescence distribution over the whole surface of the light guide film LGF. To do so, it is preferable that the light radiator VHOE would be configured to have the variable light extraction efficiency which is exponentially increasing from the side where the light entering part LIN is disposed to the opposite side.

Third Embodiment

In the first and second embodiments, we explained, especially focusing on the ultra thin film type back light unit providing the back light of which viewing angle is controlled (we call it "controlled viewing angle back light"). According to the first and second embodiments, the back light unit changes the expanding light into the collimated light so that it can provide the back light of which viewing angle is controlled. For example, the back light unit can provide the back light within specific area for the certain user only. In the case that this back light unit is applied to the liquid crystal display, the liquid crystal display is used in the privacy mode in which the video information can be recognized by the user only.

For the generally purposes, the liquid crystal display may further include a normal back light unit for general mode. In the present disclosure, we suggest one back light unit by which the general mode and the privacy mode can be selected by the user.

Figure 13:
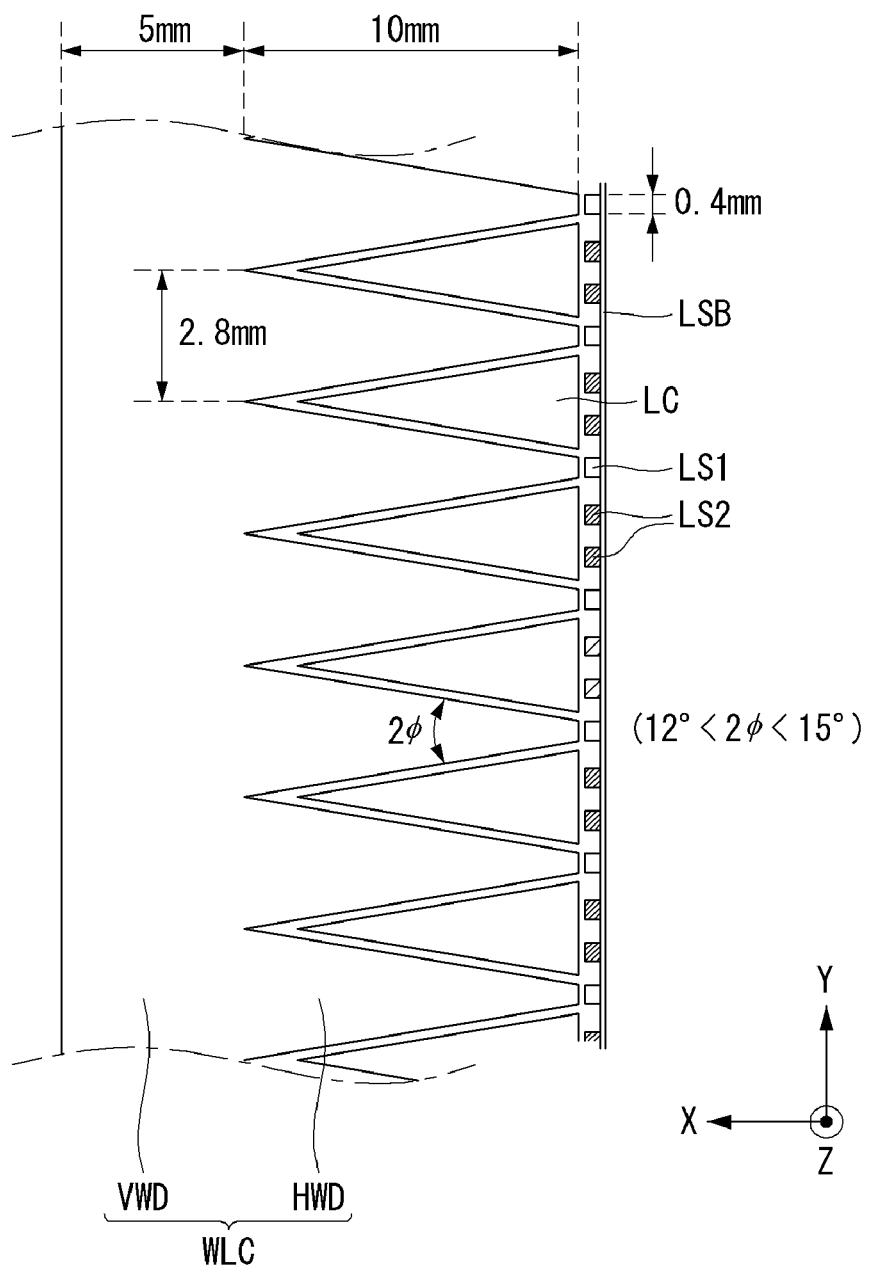
FIG. 13 is a plane view illustrating a structure of an ultra thin film type back light unit according to the third embodiment of the present disclosure.

Hereinafter, referring to FIG. 13, we will explain about the third embodiment of the present disclosure. The ultra thin film type back light unit according to the third embodiment of the present disclosure has the characteristics of selecting the wide viewing angle mode (or "general mode") and the narrow viewing angle mode (or "privacy mode"). We call it the "viewing angle switchable back light unit". FIG. 13 is a plane view illustrating a structure of an ultra thin film type back light unit according to the third embodiment of the present disclosure.

Referring to FIG. 13, the ultra thin film type back light unit according to the third embodiment of the present disclosure comprises a light guide film LGF, a light source array LSA, a light collimator WLC, a light coupler LC, an adhesive layer AH and a light radiator VHOE. The light guide film LGF includes a light entering part LIN, a light guiding part LWG, and a light radiating part LOT. The light entering part LIN sends lights provided from the light source to the light guide film LGF. The light guiding part LWG distributes and propagates the incident lights from the light entering part LIN over most of all areas of the light guide film LGF. The light radiating part LOT outputs the back light through the upper surface of the light guide film LGF with even distribution over the surface area.

The light source array LSA is disposed near the light entering part LIN of the light guide film LGF. Especially, the light source array LSA includes a first light source LS1, a second light source LS2 and a light source board LB. The first light source LS1 provides the lights to the light collimator WLC. The second light source LS2 provides the lights to the light coupler LC. On the light source board LB, the first and second light sources LS1 and LS2 are mounted in certain array manner. Further, the light source board LB includes a circuit for providing the electric power to the first and second light sources LS1 and LS2.

At the light entering part LIN of the light guide film LGF, a light collimator WLC is disposed. In detail, the light collimator WLC may be attached on the upper surface of the light guide film LGF by an adhesive layer AH, at the light entering part LIN. The light collimator WLC is an optical element for converting and/or changing the light supplied from the first light source LS1 into a collimated light both on the horizontal plane (XY plane) and on the vertical plane (XZ plane).

The light collimator WLC of the ultra thin film type back light unit according to the second embodiment of the present disclosure comprises a light incident surface LIS, a horizontal taper part HWD and a vertical wedge part VWD, like the first and second embodiments. The light incident surface LIS is facing with the first light source LS1. Each of the first light sources LS1 is disposed at each of the light incident surface LIS of the horizontal taper part HWD. The horizontal taper part HWD collimates the incident light passing the light incident surface LIS on the horizontal plane (XY plane). The vertical wedge part VWD collimates the incident light on the vertical plane (XZ plane).

The light coupler LC gathers and provides the lights from the second light source LS2 to the light guide film LGF. The light coupler LC, unlike the light collimator WLC, does not collimate the lights but gathering the expanded lights and provides them to the light entering part LIN of the light guide film LGF.

The light coupler LC may have a triangle plate shape occupying the empty space between each horizontal taper part HWD of the light collimator WLC. The second light source LS2 may be same kind of the light emitting diode with the first light source LS1. The lights from the first light source LS1 are converted into the collimated lights by the light collimator. The lights from the second light source LS2, even though have the same property with the lights from the first light source LS1, are not collimated by the light coupler LC, but merely transferred into the light entering part LIN of the light guide film LGF.

The collimated light by the light collimator WLC enters into the light guiding part LWG of the light guide film LGF having narrow incident angle range. The light guiding part LWG is the element for receiving the collimated light from the light entering part LIN and for sending it to the opposite side of the light entering part LIN without any loss of the collimated light. The light guiding part LWG is the most of all portions of the light guide film LGF. On the upper surface of the light guiding part LWG, a light radiator VHOE is disposed. It is preferable that the light radiator VHOE has a refractive index lower than that of the light guiding part LWG. In detail, the light in the light guide film LGF would be propagated by the total internal reflection, at the bottom surface of the light guide film LGF. At the upper surface of the light guide film LGF, as propagating the light, most of light would be reflected by the total reflection condition, and some portions of the light would be refracted and go out of the light guide film LGF. Therefore, it is preferable that the refractive index of the light radiator VHOE is higher than that of the air and lower than that of the light guide film LGF.

As the light is propagated through the light guide film LGF, the light radiator VHOE extracts and radiates some portions of the light out of the light guide film LGF. By attached on the upper surface of the light guide film LGF, the light radiator VHOE provides a back light substantially perpendicular to the surface of the light guide film LGF. Further, it is preferable that the light radiator VHOE provides the back light having even luminescence distribution over the whole surface of the light guide film LGF. To do so, it is preferable that the light radiator VHOE would be configured to have the variable light extraction efficiency which is exponentially increasing from the side where the light entering part LIN is disposed to the opposite side.

The third embodiment of the present disclosure suggests a viewing angle switchable back light unit. In other words, the third embodiment suggests an ultra thin film type back light unit which can freely select between the narrow viewing angle and the wide viewing angle. It is preferable that the light radiator VHOE have various optical function and superior optical properties. For example, the light radiator VHOE may be a transparent film having a volume grating pattern or a holography pattern.

The back light unit according to the third embodiment of the present disclosure comprises a first light source LS1 and a light collimator WLC for providing the back light of which viewing angle is controlled. Further, it comprises a second light source LS2 and a light coupler LC for providing the back light having wide viewing angle. When turning of the first light source LS1 only, the light collimator WLC converts the light from the first light source LS1 into the collimated light 100. As the collimated light 100 is propagated within the light guide film LGF, the back light 400 having certain directivity is output through the light radiator 400 so as to be provided within certain area.

When turning on the second light source LS2, the light from the second light source LS2 is transferred to the light guide film LGF through the light coupler LC. The light transferred by the light coupler LC is not collimated but has the original optical property of the light. As passing through the light guide film LGF, the back light which does not have any directivity is output throughout the light guide film LGF and light radiator VHOE. When the back light unit is used for general purpose, only the second light source LS2 may be turn on. In some cases, both of the second light source LS2 and the first light source LS1 may be turn on simultaneously.

Fourth Embodiment

Figure 14A:
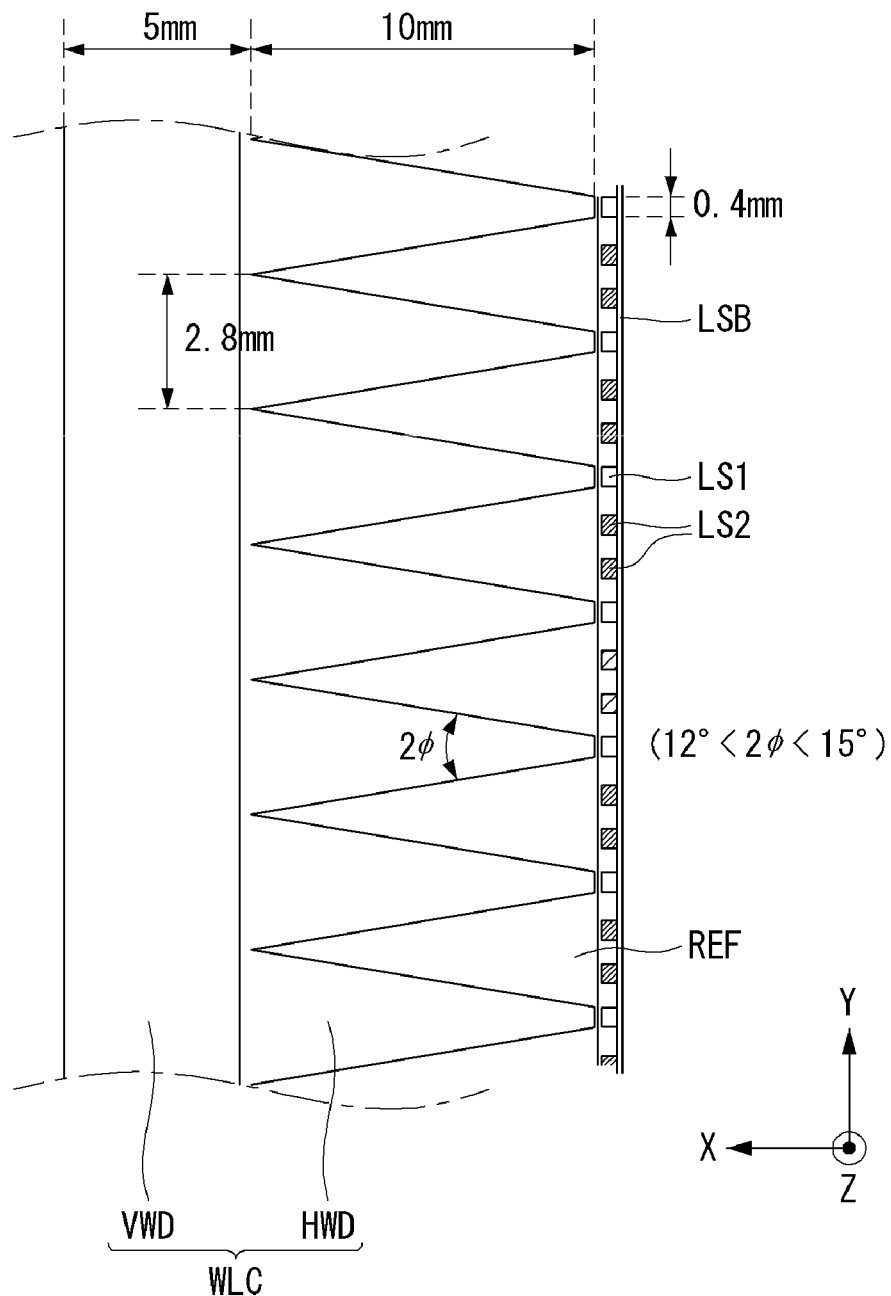
FIGS. 14A and 14B are views illustrating the structure of an ultra thin film type back light unit according to the fourth embodiment of the present disclosure.

Hereinafter, referring to FIGS. 14A and 14B, we will explain about the fourth embodiment of the present disclosure. The ultra thin film type back light unit according to the fourth embodiment of the present disclosure has the characteristics of selecting the wide viewing angle mode (or "general mode") and the narrow viewing angle mode (or "privacy mode"). FIG. 14A is a plane view illustrating the structure of an ultra thin film type back light unit according to the fourth embodiment of the present disclosure. FIG.

14B is a side view illustrating the structure of an ultra thin film type back light unit according to the fourth embodiment of the present disclosure.

Figure 14B:
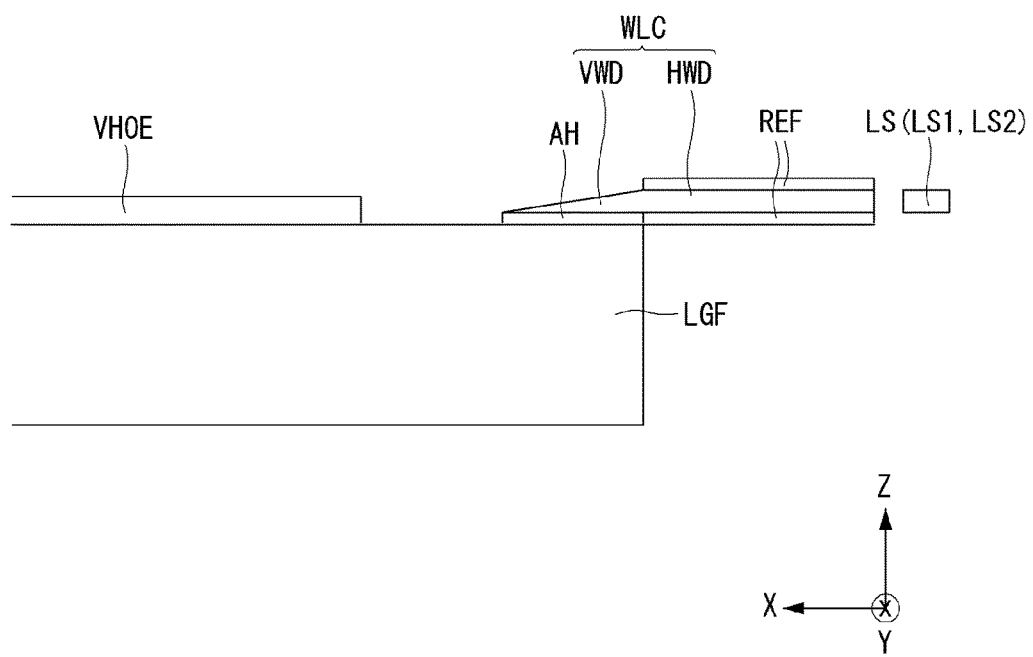

Referring to FIGS. 14A and 14B, the ultra thin film type back light unit according to the fourth embodiment of the present disclosure comprises a light guide film LGF, a light source array LSA, a light collimator WLC, a reflector REF, an adhesive layer AH and a light radiator VHOE. The light guide film LGF includes a light entering part LIN, a light guiding part LWG, and a light radiating part LOT. The light entering part LIN sends lights provided from the light source to the light guide film LGF. The light guiding part LWG distributes and propagates the incident lights from the light entering part LIN over most of all areas of the light guide film LGF. The light radiating part LOT outputs the back light through the upper surface of the light guide film LGF with even distribution over the surface area.

The light source array LSA is disposed near the light entering part LIN of the light guide film LGF. Especially, the light source array LSA includes a first light source LS1, a second light source LS2 and a light source board LB. The first light source LS1 provides the lights to the light collimator WLC. The second light source LS2 is disposed facing the empty space between each of the horizontal taper parts HWD and provides the lights to the empty space. On the light source board LB, the first and second light sources LS1 and LS2 are mounted in certain array manner. Further, the light source board LB includes a circuit for providing the electric power to the first and second light sources LS1 and LS2.

At the light entering part LIN of the light guide film LGF, a light collimator WLC is disposed. In detail, the light collimator WLC may be attached on the upper surface of the light guide film LGF by an adhesive layer AH, at the light entering part LIN. The light collimator WLC is an optical element for converting and/or changing the light supplied from the light source LS into a collimated light both on the horizontal plane (XY plane) and on the vertical plane (XZ plane).

The light collimator WLC of the ultra thin film type back light unit according to the second embodiment of the present disclosure comprises a light incident surface LIS, a horizontal taper part HWD and a vertical wedge part VWD, like the first and second embodiments. The light incident surface is facing with the first light source LS1. The horizontal taper part HWD collimates the incident light passing the light incident surface LIS on the horizontal plane (XY plane). The vertical wedge part VWD collimates the incident light on the vertical plane (XZ plane).

The second light sources LS2 are disposed as facing the empty space between each of the horizontal taper parts HWD. In the third embodiment, the light coupler LC is occupying the empty space between each of the horizontal taper parts HWD. In the fourth embodiment, the empty spaces are remained as the empty state. The empty space has the reversed tapered triangular shape, the reversed shape to the shape of the horizontal taper part HWD. Therefore, the lights provided from the second light sources LS2 enter into the light entering part LIN of the light guiding part LIN as not being collimated but having the expanding property.

The second light source LS2 may be same kind of the light emitting diode with the first light source LS1. The lights from the first light source LS1 are converted into the collimated lights by the light collimator. The lights from the second light source LS2, even though have the same property with the lights from the first light source LS1, are not collimated by the light coupler LC, but merely transferred into the light entering part LIN of the light guide film LGF.

The lights out from the second light source LS2 to the air do not meet any optical element when just leaving from the second light source LS2. Therefore, the lights from the second light source LS2 are the expanding lights. That is, these lights expand to the all directions including the right, the left, the upper and the lower sides. The lights going to the right and left sides meet the horizontal taper part HWD. As the both sides of the horizontal taper part HWD in the view of the empty space have the reversed tapered triangular shape, the expanding property of the lights going to the right and left sides would be expanded wider when entering into the light guide film LGF. In the interim, the light going to the upper and lower sides may be leaked or be the noise lights.

In order to prevent the lights going to the upper and lower sides from being leaked or causing the noise lights, it is preferable that a reflector REF is disposed at each of the upper side and the lower side, respectively. For easiness of attaching the reflector REF, it is preferable that the reflector REF is attached on the top surface and the bottom surface of the horizontal taper part HWD of the light collimator WLC. The reflector REF is preferably selected any one of the reflecting film or the reflecting sheet on which a reflecting layer is coated.

The collimated light by the light collimator WLC enters into the light guiding part LWG of the light guide film LGF having narrow incident angle range. The light guiding part LWG is the element for receiving the collimated light from the light entering part LIN and for sending it to the opposite side of the light entering part LIN without any loss of the collimated light. The light guiding part LWG is the most of all portions of the light guide film LGF. On the upper surface of the light guiding part LWG, a light radiator VHOE is disposed. It is preferable that the light radiator VHOE has a refractive index lower than that of the light guiding part LWG. In detail, the light in the light guide film LGF would be propagated by the total internal reflection, at the bottom surface of the light guide film LGF. At the upper surface of the light guide film LGF, as propagating the light, most of light would be reflected by the total reflection condition, and some portions of the light would be refracted and go out of the light guide film LGF. Therefore, it is preferable that the refractive index of the light radiator VHOE is higher than that of the air and lower than that of the light guide film LGF.

As the light is propagated through the light guide film LGF, the light radiator VHOE extracts and radiates some portions of the light out of the light guide film LGF. By attached on the upper surface of the light guide film LGF, the light radiator VHOE provides a back light substantially perpendicular to the surface of the light guide film LGF. Further, it is preferable that the light radiator VHOE provides the back light having even luminescence distribution over the whole surface of the light guide film LGF. To do so, it is preferable that the light radiator VHOE would be configured to have the variable light extraction efficiency which is exponentially increasing from the side where the light entering part LIN is disposed to the opposite side.

The back light unit according to the fourth embodiment of the present disclosure comprises a first light source LS1 and a light collimator WLC for providing the back light of which viewing angle is controlled. Further, it comprises a second light source LS2 and a reflector REF for providing the back light having wide viewing angle. When turning of the first light source LS1 only, the light collimator WLC converts the light from the first light source LS1 into the collimated light 100. As the collimated light 100 is propagated within the light guide film LGF, the back light 400 having certain directivity is output through the light radiator 400 so as to be provided within certain area.

When turning on the second light source LS2, the light from the second light source LS2 is transferred to the light guide film LGF through the horizontal taper part HWD of the light collimator WLC as the expanding property is increased. As passing through the light guide film LGF, the back light which does not have any directivity is output throughout the light guide film LGF and light radiator VHOE. When the back light unit is used for general purpose, only the second light source LS2 may be turn on. In some cases, both of the second light source LS2 and the first light source LS1 may be turn on simultaneously.

By applying the back light unit according to the embodiments of the present disclosure to the liquid crystal display, ultra thin film type liquid crystal display can be designed in which the total thickness is very thin similar with the thickness of the organic light emitting diode display. As the ultra thin film type back light unit suggests either the wide viewing angle or the narrow viewing angle, selectively, the ultra thin film type liquid crystal display can be applied to much more various appliances. Further, applying to the liquid crystal display embedding touch input device such as the in-cell touch panel or the on-cell touch panel type, the liquid crystal display can be operated either in the privacy mode or in the general mode selectively, without any obstruction and/or hindrance for the touch operation.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A back light unit, comprising:
   a light guide film including;
      a light entering part defined at one side;
      a light guiding part extending from the one side to an opposite side of the one side; and
      a light radiating part defined on one plane surface;
   a light radiator disposed on the light radiating part;
   a first light source disposed near to the light entering part; and
   a light collimator disposed on the light entering part as facing to the first light source,
   wherein the light collimator:
      receives an expanding light from the first light source,
      converts the expanding light into a collimated light, and
      provides the collimated light to the light entering part, and
   wherein the light collimator includes:
      a horizontal taper part disposed near to the first light source, the horizontal taper part collimating the expanding light from the first light source on a horizontal plane; and
      a vertical wedge part extending from the horizontal taper part, the vertical wedge part collimating the expanding light from the first light source on a vertical plane.

2. The back light unit of claim 1, wherein the light guide film has a refractive index equal to or less than a refractive index of the light collimator.

3. The back light unit of claim 1, further comprising:
   a light absorber disposed on a bottom surface of the light guide film as facing with the light collimator, wherein the horizontal taper part and the vertical wedge part are attached on the light entering part of the light guide film by an adhesive layer having a lower refractive index than the refractive index of the light collimator.

4. The back light unit of claim 1, wherein:
   only the vertical wedge part of the light collimator is attached on the light entering part of the light guide film by an adhesive layer having a lower refractive index than the refractive index of the light collimator; and
   the horizontal taper part is disposed outside of the light guide film.

5. The back light unit of claim 1, wherein:
   the horizontal taper part includes:
      a light incident surface closing to the first light source, and having a height and a width corresponding to a size of the first light source;
      a top surface and a bottom surface extended to one direction from the light incident surface with a predetermined distance and with a predetermined expanding angle; and
      two side surfaces defined as the height is extended from the light incident surface with the predetermined distance; and
   the vertical wedge part includes an inclined surface extended along to the one direction from the horizontal taper part in which the height is linearly decreased as converging from the top surface to the bottom surface along to a length of the vertical wedge part.

6. The back light unit of claim 5, wherein:
   a plurality of the horizontal taper part are disposed along to a side of the vertical wedge part in a series, the side is perpendicular to the one direction; and
   each of a plurality of the first light source is disposed at each of the light incident surface of the horizontal taper part.

7. The back light unit of claim 1, wherein the light collimator controls an incident angle of the collimated light:
   to be larger than a total internal reflection critical angle at an interface between the light guide film and air; and
   to be smaller than a total internal reflection critical angle at an interface between the light guide film and the light radiator.

8. The back light unit of claim 1, wherein:
   the light guiding part propagates the collimated light from the one side to the opposite side;
   as propagating the collimate light, the light guiding part totally reflects the collimated light at an opposite plane surface facing to the one plane surface, and
   the light guiding part, at the one plane surface:
      refracts some of the collimated light to the light radiator to output the some of the collimated light from the light guide film; and
      reflects others of the collimated light to the opposite plane surface.

9. The back light unit of claim 1, further comprising:
   a light coupler disposed laterally near to the light collimator; and
   a second light source disposed as facing to the light coupler and laterally near to the first light source.

10. The back light unit of claim 1, further comprising:
    a second light source disposed as facing an empty space between each of the horizontal taper part; and
    a reflector disposed on at least one of a top surface and a bottom surface.

* * * * *